(12) United States Patent
Hinkle

(10) Patent No.: US 7,725,514 B2
(45) Date of Patent: May 25, 2010

(54) LIQUID AND PLATE-BASED RANDOM NUMBER GENERATOR

(75) Inventor: Jonathan R. Hinkle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1100 days.

(21) Appl. No.: 11/385,547

(22) Filed: Mar. 21, 2006

(65) Prior Publication Data

US 2007/0245293 A1    Oct. 18, 2007

(51) Int. Cl.
    G06F 7/58       (2006.01)
(52) U.S. Cl. ....................... 708/250; 708/255
(58) Field of Classification Search .......... 708/250–256
    See application file for complete search history.

(56) References Cited

U.S. PATENT DOCUMENTS

| | | | |
|---|---|---|---|
| 5,781,458 A | 7/1998 | Gilley | |
| 6,249,009 B1 | 6/2001 | Kim et al. | |
| 6,421,780 B2 * | 7/2002 | Tichenor | 380/268 |
| 6,463,449 B2 * | 10/2002 | Tichenor | 708/255 |
| 2001/0046293 A1 | 11/2001 | Gleeson | |
| 2003/0108197 A1 | 6/2003 | Crandall | |
| 2003/0229657 A1 | 12/2003 | Dunn | |

FOREIGN PATENT DOCUMENTS

JP        2001-117756        4/2001

* cited by examiner

*Primary Examiner*—Tan V Mai
(74) *Attorney, Agent, or Firm*—Dillon & Yudell LLP

(57) ABSTRACT

A random number generating unit includes an external containment casing and a measurement cone within the external containment casing, to which liquid detection contacts are attached. One or more terminals on a random number generation integrated circuit, which terminals connect to the liquid detection contacts are included, as is a primary reservoir connected to a secondary reservoir containing a pump and a dropper to provide a bead of liquid from the pump, wherein the bead falls on the measurement cone to be detected by the liquid detection contacts and then fall into the primary reservoir.

19 Claims, 2 Drawing Sheets

LIQUID AND PLATE-BASED RANDOM NUMBER GENERATOR

BACKGROUND OF THE INVENTION

1. Technical Field

The present invention relates in general to the field of computers, and in particular to generating random numbers. Still more particularly, the present invention relates to a method and system for generating random numbers with a liquid-and-plate based generator.

2. Description of the Related Art

A random number generator is a computational or physical device designed to generate a sequence of numbers that does not have a pattern, so that the sequence can be treated as being random. Random number generators have existed since ancient times, in the form of dice and coin flipping, the shuffling of playing cards, the use of yarrow stalks and many other methods.

It is universally agreed is that any "random number generator" based solely on deterministic computation cannot be regarded as a "true" random number generator, since its output is inherently predictable. John von Neumann once famously said "Anyone who uses software to produce random numbers is in a state of sin".

Even carefully chosen pseudo-random number generators are an unacceptable replacement for true random numbers for some applications. Rigorous (and expensive) numerical analysis is often needed to have confidence their use is acceptable in those applications in which they are appropriate. Particularly for security applications, the use of pseudo-random numbers instead of true random numbers can completely compromise the application for which they are being used.

There is a general consensus that true random numbers are most likely to be found by looking at physical processes which are, as far as we know, unpredictable. A physical random number generator is based on an essentially random atomic or subatomic physical phenomenon. Examples of such phenomena include radioactive decay, thermal noise, and shot noise. Physical random number generators that rely on quantum mechanical processes have the advantage that the sequences they produce are completely unpredictable, if we assume that current theories of quantum physics are correct.

Applications in scientific, military, and cryptography fields require true random numbers that are not deterministic. Because generating these true random numbers requires a source of entropy that can be used to create an unpredictable sequence, sensitive applications frequently use radioactive source as described above. The points in time that radioactive sources decay are in no way uniform or periodic. However, many entropy sources such as radioactive decay timing are often very expensive.

The above, as well as additional purposes, features, and advantages of the present invention will become apparent in the following detailed written description.

SUMMARY OF THE INVENTION

A random number generating unit is disclosed. The random number generating unit comprises an external containment casing and a measurement cone within the external containment casing, to which liquid detection contacts are attached. One or more terminals on a random number generation integrated circuit, which terminals connect to the liquid detection contacts are included, as is a primary reservoir connected to a secondary reservoir containing a pump and a dropper to provide a bead of liquid from the pump, wherein the bead falls on the measurement cone to be detected by the liquid detection contacts and then fall into the primary reservoir.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Drop beads of liquid liquid on the point of a cone covered with small conductive plates and monitor the plates to see which electrically connect to each other. This liquid drop/plated cone device would be much less expensive than other sources of entropy, but is still very reliable and not easily influenced by deterministic noise sources.

Figure 1:
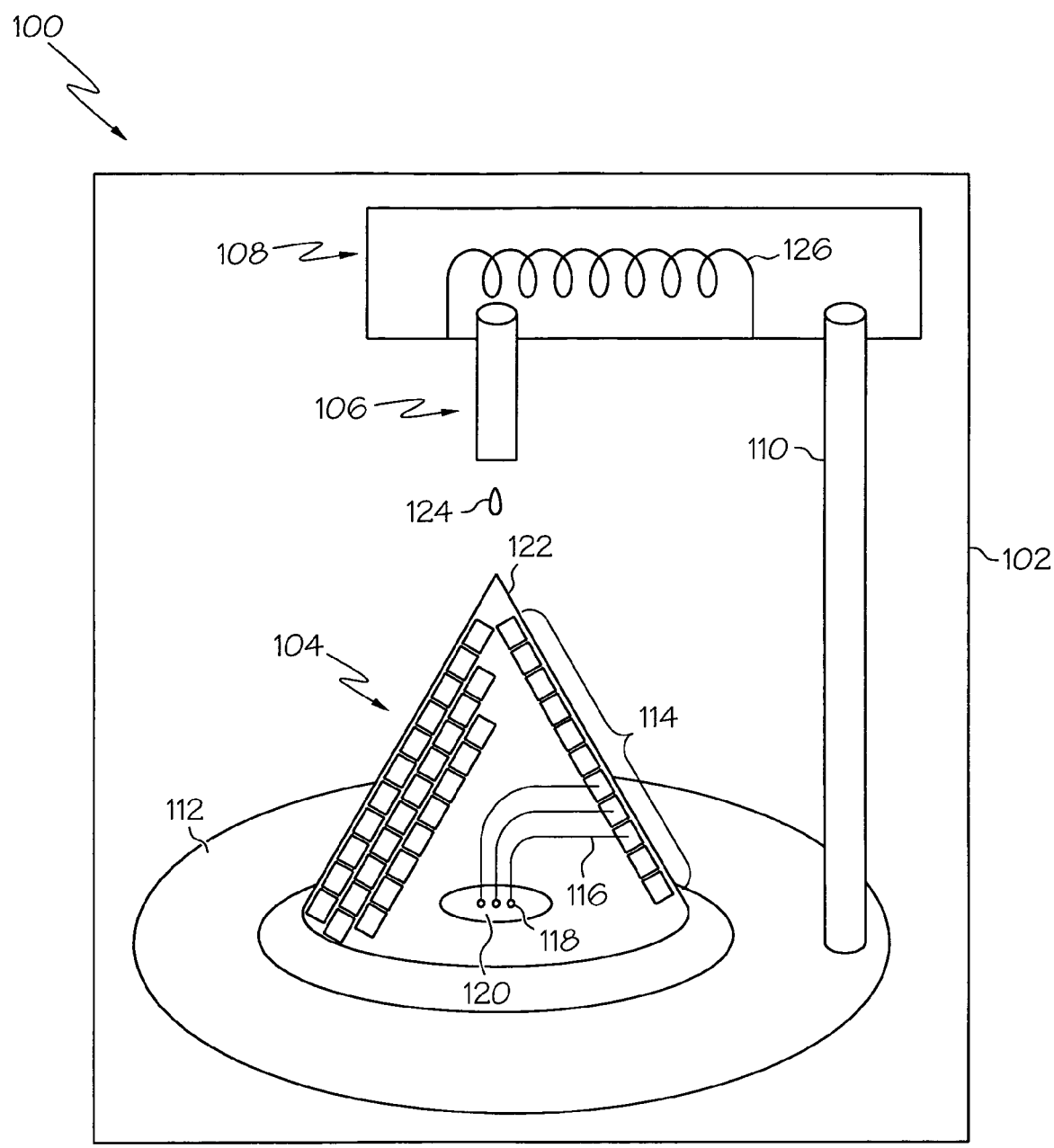
FIG. 1 illustrates a liquid dropper, measurement and random number generation device in accordance with a preferred embodiment of the present invention.

With reference now to FIG. 1, there is depicted a liquid dropper, measurement and random number generation device in accordance with a preferred embodiment of the present invention. Random number unit 100 includes an external containment casing 102, which is made of metal and includes a measurement cone 104, to which liquid detection contacts 114 are attached. Liquid detection contacts 114 are connected to terminals 118 on a random number generation integrated circuit 120 by connection wires 116. A dropper 106 provides a bead of liquid 124, which falls on a center point 122 of measurement cone 104 to be detected by liquid detection contacts 114 and then fall into a primary reservoir 112. Liquid is drawn from primary reservoir 112 through a transmission pipe 110 to a secondary reservoir 108 with pump 126. The pump 126 within secondary reservoir 108 is a resistive heating element. The discharge of liquid drops by dropper 106 is compelled through the action of pump 126 under the control of random number generation integrated circuit 120.

Dropper 106 is aligned and calibrated to provide a bead of liquid, which in a preferred embodiment is a bead of Mercury, exactly above measurement cone 104, which is plated with hundreds of very small liquid detection contacts 114 composed of copper plates. These liquid detection contacts 114 sense when a connection is made across two or more liquid detection contacts 114. Each of the liquid detection contacts 114 is individually connected to a group of terminals 118 on random number generation integrated circuit 120 by connection wires 116 housed inside of measurement cone 104.

Each time a bead of liquid 124 is dropped by dropper 106, the bead of liquid 124 hits the center point 122 of measurement cone 104 and flows down measurement cone 104 in a non-uniform and non-deterministic fashion. The basis of the chaotic nature of the device lies with the unpredictable interaction between molecules of liquid detection contacts 114 measurement cone 104 and the liquid atoms within bead of liquid 124. The very high surface tension of bead of liquid 124 keeps bead of liquid 124 from leaving "trails" as it flows down the surface of liquid detection contacts 114 on measurement cone 104. This absence of trails facilitates random number generation, because it allows the next bead of liquid 124 to have no new tendency to flow one way or another down the surface of liquid detection contacts 114 on measurement cone 104.

The liquid detection contacts 114 that are connected by bead of liquid 124 at any given point in time may be used in a wired-OR function within random number generation integrated circuit 120, whereby liquid detection contacts 114 so connected would all become 1 (active high) or 0 (active low) while the rest of the unconnected liquid detection contacts 114 (representing bits) would remain in the inactive polarity. Alternating liquid detection contacts 114 are attached to ground and pulled high (to some positive voltage level) through a resistor within random number generation integrated circuit 120. From this function, random number generation integrated circuit 120 generates random digital sequences can be generated to be used by an input device (not shown) that connects to random number generation integrated circuit 120. Bead of liquid 124 sometimes splits into multiple beads of liquid 124 and flows down the cone, providing further entropy to sequences generated by random number generation integrated circuit 120. The resulting true random binary number for each bead of liquid 124 is latched by random number generation integrated circuit 120 and sent to an input device.

Figure 2:
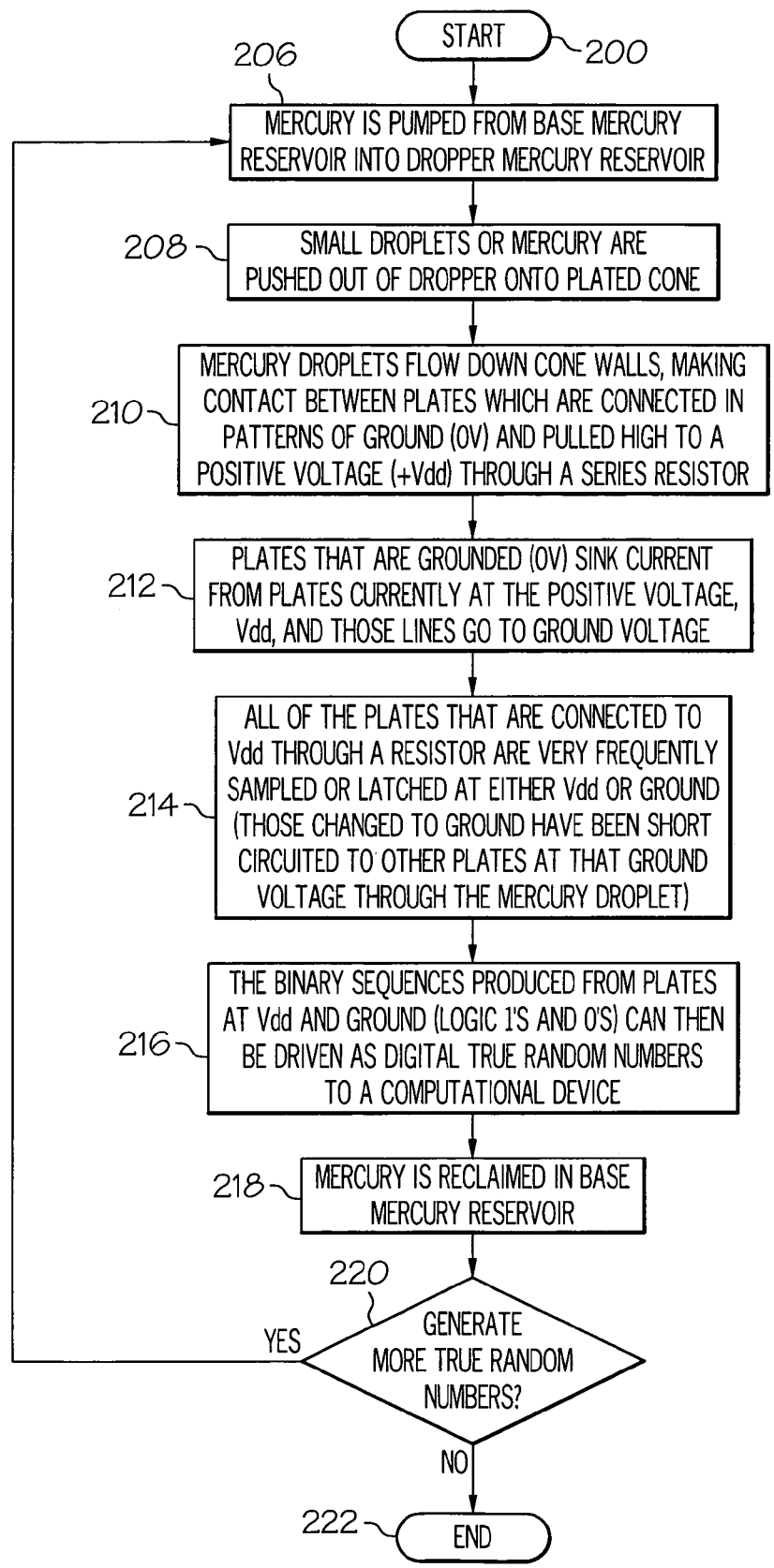
FIG. 2 is a flow chart of steps taken in a preferred embodiment of the present invention to generate random numbers with a liquid dropper, measurement and random number generation device in accordance with a preferred embodiment of the present invention.

Turning now to FIG. 2, a flow chart of steps taken in a preferred embodiment of the present invention to generate random numbers with a liquid dropper, measurement and random number generation device in accordance with a preferred embodiment of the present invention is depicted. The process starts at step 200, and then moves to step 206, which illustrates liquid for a bead of liquid 124 being pumped by pump 126 from primary reservoir 112 through a transmission pipe 110 to a secondary reservoir 108. The process then proceeds to step 208. At step 208, bead of liquid 124 is pushed out of dropper 106 onto measurement cone 104. The process then moves to step 210, which depicts bead of liquid 124 flowing down walls of measurement cone 104, making contact between liquid detection contacts 114, which are connected to terminals 118 on random number generation integrated circuit 120 through connection wires 116 in patterns of ground (0V) and pulled high to a positive voltage (+Vdd) through a series resistor in random number generation integrated circuit 120. The process next proceeds to step 212.

At step 212, liquid detection contacts 114 that are grounded (0V) sink current from liquid detection contacts 114 currently at the positive voltage, Vdd, and effected terminals 118 on random number generation integrated circuit 120 go to ground voltage. The process then moves to step 214, which illustrates random number generation integrated circuit 120 sampling liquid detection contacts 114 that are connected to Vdd of random number generation integrated circuit 120 and latching liquid detection contacts 114 that are connected to Vdd of random number generation integrated circuit 120 at either Vdd or ground. Those liquid detection contacts 114 that are changed to ground have been short circuited to other liquid detection contacts 114 at that ground voltage through bead of liquid 124.

The process next proceeds to step 216, which depicts random number generation integrated circuit 120 driving binary sequences produced from liquid detection contacts 114 at Vdd and ground as logic 1's and 0's to an input device connected to random number generation integrated circuit 120 as digital true random numbers. The process then moves to step 218, which illustrates primary reservoir 112 reclaiming bead of liquid 124 through gravitational force. The process next proceeds to step 220, which depicts random number generation integrated circuit 120 determining whether more true random numbers need to be produced. If random number generation integrated circuit 120 determines that no more true random numbers need to be produced, then the process ends at step 222. If random number generation integrated circuit 120 determines that more true random numbers need to be produced, then the process returns to step 206.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A random number generating unit comprising:
    an external containment casing;
    a measurement cone within said external containment casing, to which liquid detection contacts are attached;
    a primary reservoir connected to a secondary reservoir containing a pump;
    a dropper to provide a bead of liquid from said pump, wherein said bead falls on said measurement cone to be detected by said liquid detection contacts and then fall into said primary reservoir; and
    a random number generation integrated circuit having input terminals coupled to the liquid detection contacts, wherein said random number generation integrated circuit generates a random number based upon detection of liquid by particular ones of the liquid detection contacts.

2. The random number generating unit of claim 1, wherein said pump is a resistive heating element.

3. The random number generating unit of claim 1, wherein said external containment casing is made of metal.

4. The random number generating unit of claim 1, wherein said primary reservoir is connected to said secondary reservoir by a transmission pipe.

5. The random number generating unit of claim 1, wherein said dropper is contained within said external containment casing.

6. The random number generating unit of claim 1, wherein said dropper is configured to cause said bead of liquid to fall on a center point of said measurement cone.

7. The random number generating unit of claim 1, wherein said random number generation integrated circuit is housed within said measurement cone and said input terminals connect to said liquid detection contacts by connection wires within said measurement cone.

8. A method for generating random numbers, said method comprising:
    pumping a bead of liquid from a primary reservoir to a secondary reservoir;
    pushing said bead of liquid through a dropper onto a measurement cone covered with a set of liquid detection contacts;

establishing contact between two or more of said set of liquid detection contacts;

sinking current from one of said two or more of said set of liquid detection contacts to send to ground voltage a terminal;

sampling said terminal with a random number generation integrated circuit;

driving a random number signal to an input device from said random number generation integrated circuit on the basis of said sampling.

9. The method of claim 8, further comprising latching said terminal at a fixed voltage value.

10. The method of claim 9, wherein said step of latching said terminal at a fixed voltage value further comprises latching said terminal at a ground voltage.

11. The method of claim 8, further comprising reclaiming said bead of liquid to said primary reservoir through gravity.

12. The method of claim 8, wherein said step of sinking current from one of said two or more of said set of liquid detection contacts to send to ground voltage a terminal further comprises sinking current from one of said two or more of said set of liquid detection contacts to send to ground voltage a terminal connected by a wire to said one of said two or more of said set of liquid detection contacts.

13. The method of claim 8, wherein said step of pushing said bead of liquid through a dropper onto a measurement cone covered with a set of liquid detection contacts further comprises pushing said bead of liquid through a dropper onto the center point of a measurement cone covered with a set of liquid detection contacts which are connected to a random number generation integrated circuit by a set of connection wires.

14. The method of claim 8, wherein said step of pumping a bead of liquid from a primary reservoir to a secondary reservoir further comprising pumping a bead of liquid from a primary reservoir to a secondary reservoir through a transmission pipe.

15. A machine-readable medium having a plurality of instructions processable by a machine embodied therein, wherein said plurality of instructions, when processed by said machine, causes said machine to perform:

pumping a bead of liquid from a primary reservoir to a secondary reservoir;

pushing said bead of liquid through a dropper onto a measurement cone covered with a set of liquid detection contacts;

establishing contact between two or more of said set of liquid detection contacts;

sinking current from one of said two or more of said set of liquid detection contacts to send to ground voltage a terminal;

sampling said terminal with a random number generation integrated circuit; and driving a random number signal to an input device from said random number generation integrated circuit on the basis of said sampling.

16. The machine-readable medium of claim 15, wherein said plurality of instructions further cause the machine to perform latching said terminal at a fixed voltage value.

17. The machine-readable medium of claim 16, wherein latching said terminal at a fixed voltage value further comprises latching said terminal at a ground voltage.

18. The machine-readable medium of claim 15, wherein sinking current from one of said two or more of said set of liquid detection contacts to send to ground voltage a terminal further comprises sinking current from one of said two or more of said set of liquid detection contacts to send to ground voltage a terminal connected by a wire to said one of said two or more of said set of liquid detection contacts.

19. The machine-readable medium of claim 15, wherein pushing said bead of liquid through a dropper onto a measurement cone covered with a set of liquid detection contacts further comprises pushing said bead of liquid through a dropper onto the center point of a measurement cone covered with a set of liquid detection contacts which are connected to a random number generation integrated circuit by a set of connection wires.

* * * * *